(12) United States Patent
Abraham et al.

(10) Patent No.: US 11,960,502 B2
(45) Date of Patent: Apr. 16, 2024

(54) BYZANTINE FAULT TOLERANCE PROTOCOL FOR BACKING UP BLOCKCHAINS

(71) Applicant: VMware, Inc., Palo Alto, CA (US)

(72) Inventors: Ittai Abraham, Herzliya (IL); Guy Gueta, Herzliya (IL); Igor Golikov, Herzliya (IL); Toly Kournik, Herzliya (IL); Tsvetomir Dimitrov, Sofia (BG)

(73) Assignee: VMware LLC, Palo Alto, CA (US)

( * ) Notice: Subject to any disclaimer, the term of this patent is extended or adjusted under 35 U.S.C. 154(b) by 263 days.

(21) Appl. No.: 17/555,053

(22) Filed: Dec. 17, 2021

(65) Prior Publication Data

US 2023/0195750 A1 Jun. 22, 2023

(51) Int. Cl.
*G06F 16/20* (2019.01)
*G06F 11/14* (2006.01)
*G06F 16/27* (2019.01)

(52) U.S. Cl.
CPC ........ *G06F 16/273* (2019.01); *G06F 11/1451* (2013.01); *G06F 2201/80* (2013.01)

(58) Field of Classification Search
None
See application file for complete search history.

(56) References Cited

U.S. PATENT DOCUMENTS

2020/0117657 A1* 4/2020 Xie ........................ H04L 9/3239

OTHER PUBLICATIONS

Miguel Castro and Barbara Liskov, "Practical Byzantine Fault Tolerance", Laboratory for Computer Science, Massachusetts Institute of Technology, Appears in the Proceedings of the Third Symposium on Operating Systems Design and Implementation, Feb. 1999, 14 pages.
Guy Golan et al., "SBFT: A Scalable and Decentralized Trust Infrastructure", arXiv:1804.01626v3, Jan. 2, 2019, 14 pages.

\* cited by examiner

*Primary Examiner* — Belix M Ortiz Ditren
(74) *Attorney, Agent, or Firm* — Quarles & Brady LLP (57) ABSTRACT

In some embodiments, a method sends first messages that request first information for a set of blocks of the blockchain to the N replicas. Each replica maintains a respective instance of the blockchain. Second messages is received from at least a portion of the N replicas. The second messages include the first information for the set of blocks from each respective instance of the blockchain that is maintained by the N replicas. The method analyzes the first information to determine whether a consensus on the first information is reached by a number of replicas. When consensus is reached, a request is sent to a replica for one or more blocks to back up to a backup blockchain and second information is received for the one or more blocks from the replica. The method uses the second information to back up the one or more blocks in the backup blockchain.

21 Claims, 8 Drawing Sheets

BYZANTINE FAULT TOLERANCE PROTOCOL FOR BACKING UP BLOCKCHAINS

BACKGROUND

State machine replication (SMR) is used for building a fault-tolerant distributed computing system where the system provides a service whose operations and state are replicated across multiple nodes, known as replicas. The service may be implemented in the blockchain space (e.g., using a ledger). The blockchain may be distributive in nature, where each replica may store a copy of the blockchain. When the state of a blockchain for a replica needs to be synced, the blocks of the blockchain may be downloaded from another replica. However, the download process may be very slow. For example, each block would need to be downloaded from the blockchain, and then the blocks validity verified, the transactions found in the block executed, and the block saved locally. Because of this, syncing a full blockchain may take a long period of time, such as days, depending on the amount of data in the blockchain. Also, the performance of the backup process may depend heavily on the computing power, storage, and network speed of the replicas.

When a blockchain is maintained for an enterprise, there may be fewer replicas compared to blockchains that are maintained publicly. When certain events occur, such as a malicious attack, some or all replicas may lose the data. In the case of all replicas losing the data, the data for the blockchain may be lost for good. However, if a small number of replicas still have the blockchain stored, other replicas may sync their blockchain with these replicas. However, when the syncing occurs, the replicas involved in the syncing process may be brought offline, reducing the number of available replicas and potentially disrupting the performance of the enterprise blockchain during the syncing process and the enterprise blockchain may become unusable.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In the accompanying drawings.

DETAILED DESCRIPTION

In the following description, for purposes of explanation, numerous examples and specific details are set forth to provide a thorough understanding of embodiments of the present disclosure. Some embodiments as expressed in the claims may include some or all the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should be construed as inclusive of the well understood mechanism.

The system provides a backup of a blockchain that is maintained by replicas in the system. The backup may be performed by a replica (referred to hereafter as a "backup client") that is configured to communicate with replicas that participate in the consensus process and is part of the state machine replication system. In some embodiments, the backup client may only back up the blockchain and not participate in the consensus process to reach consensus on committing, executing transaction requests from clients and writing new blocks to the blockchain. However, in some cases, the backup client may be part of a replica that participates in the consensus process. The function of the backup client in the system may be to back up the data in the blockchain. Data from the blockchain may be downloaded by the backup client from blockchains that are maintained by replicas in the system. If the backup client is part of a replica, then that replica is treated as any replica in the system, and backup client communicates with that replica in the same manner as other replicas in the system. The data may be saved to storage by the backup client.

The storage that is used to store the backup blockchain may be external storage to the replicas that participate in the consensus process, such as stored on a different computing device. The backup blockchain stored on the storage may be later used to re-create the internal state of the blockchain at the replicas. Using the backup client to back up the blockchain data may provide many advantages. For example, if a replica needs to sync or restore its blockchain, the replica is brought offline and does not participate in the consensus process. Also, if the state of another replica is used to restore another replica's blockchain, both of the replicas may be brought offline and do not participate in the consensus process. However, because the state of a blockchain on a replica that participates in the consensus process is not being used in the syncing process, at least one of the replicas may not have to be brought offline to help re-create the state of a blockchain at another replica because the backup client is used. Also, the external storage that is used may be configured to transfer data faster than storage on a replica that is participating in the consensus process, which may improve the performance of the backup. Further, by maintaining a full backup of the blockchain on external storage, replicas that participate in the consensus process may be allowed to perform different storage options with their respective blockchains that are being maintained. For example, some blocks of the blockchain may be deleted by replicas, such as some blocks are deleted when the blocks may be less likely to be accessed (e.g., older blocks). If these deleted blocks need to be restored, the blocks may be restored from the backup by the replica. Additionally, when a large attack of the blockchains occurs and blockchains are lost on a large number of replicas, the backup of the blockchain in external storage may be used to restore the blockchains on the replicas while not interrupting the service being provided by any replicas that have not been affected by the attack.

System Overview

Figure 1:
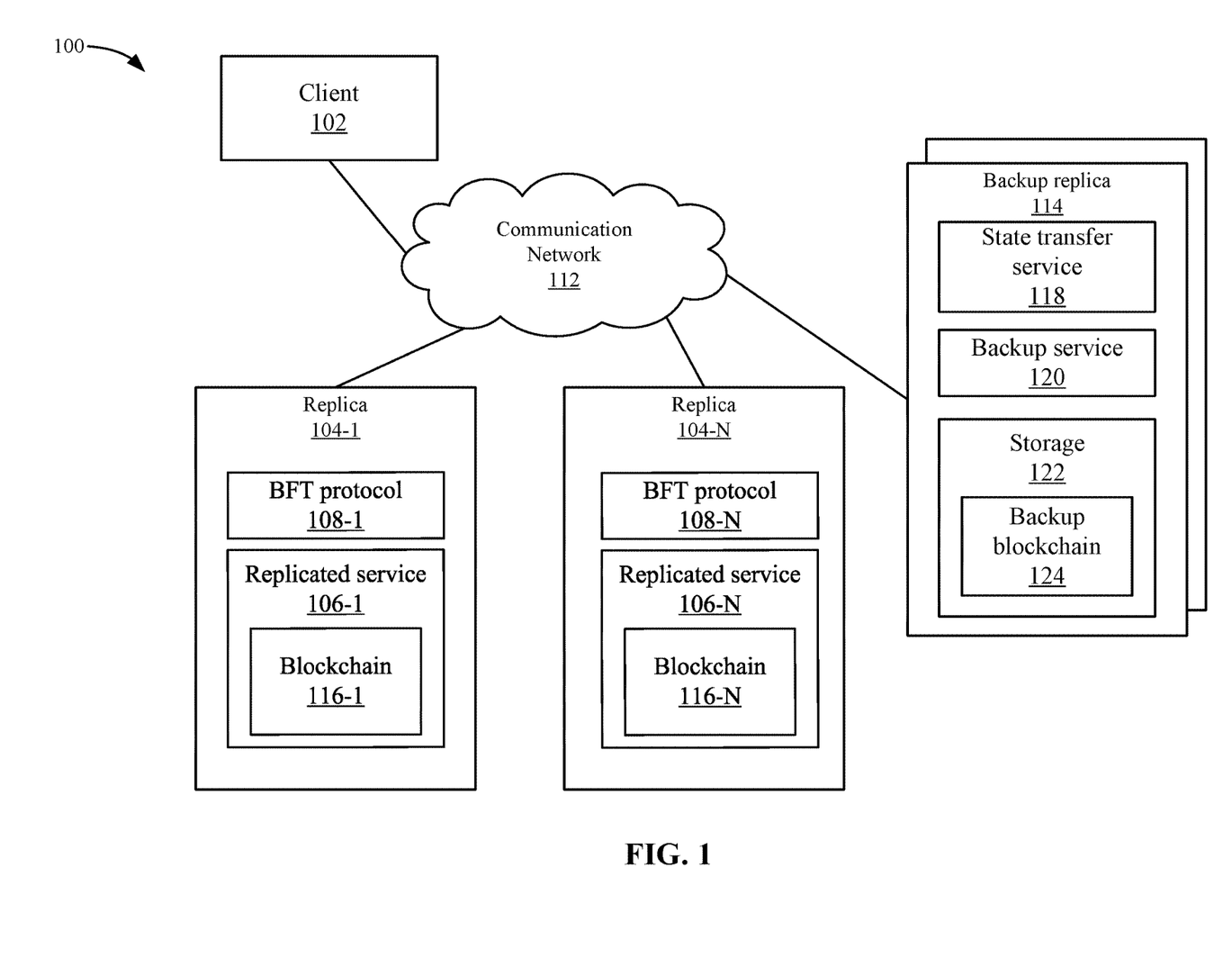
FIG. 1 depicts a system for implementing a state machine replication-based computing system according to some embodiments.

FIG. 1 depicts a system 100 for implementing a state machine replication-based computing system according to some embodiments. System 100 includes a client 102 and N replicas 104-1, . . . , 104-N (collectively referred to as replicas 104). Replicas 104 may be interconnected via a communication network 112. Each replica 104 may be a physical or virtual machine that is configured to run an instance of a replicated service 106 (respectively replicated service 106-1, replicated service 106-2, . . . , replicated service 106-N). Examples of replicated service 106 include a blockchain service storage, a data storage service, etc. Client 102 consumes replicated service 106 by submitting requests for service transactions to a replica 104. In response, replicas 104 perform a consensus process to determine whether to commit and execute the request. The commitment of a transaction may indicate a consensus has been reached, such as quorum of replicas has voted on or agreed on the proposal sent by a primary replica 104. Replicas 104 may then execute the transaction. Replicas 104 may update respective state to reflect the results of the execution.

To ensure that replicas 104 sequence the execution of the transaction for the request submitted by client 102 in an identical fashion and thus maintain consistent service states, the state machine replication system may run a protocol on each replica 104, such as a BFT protocol (respective BFT protocols 108-1, 108-2, . . . , 108-N). Examples of BFT protocols include practical BFT (PBFT), scalable BFT (SBFT), and other protocols. In one example of a protocol, in each view, one replica, referred as a primary replica, sends a proposal for a decision value (e.g., operation sequence number) to the other non-primary replicas and attempts to reach a consensus, such as 2F+1 replicas, to agree upon the proposal, where F is the maximum number of replicas that may be faulty. For brevity, every protocol message communicated between replicas may be digitally signed by the sender and the receiver verifies the digital signature upon message receipt. Any one of a number of digital signature schemes may be used for this purpose, including threshold signatures or multi-signatures. Additionally, every message in the backup process described below may be digitally signed and verified.

In some embodiments, BFT protocol 108 is used to reach a consensus for storing blocks in a blockchain 116 in an agreed upon sequence. An instance of a blockchain 116, such as blockchain 116-1 to 116-N, may be maintained by replicas 104-1 to 104-N, respectively. Blockchain 116 may be a storage record, such as a list of records or a ledger. The records may be referred to as blocks that may be linked together using cryptography. Each block may contain a cryptographic hash of the previous block, a timestamp, and transaction data. The timestamp is used to prove that the transaction data existed when the block was published to be used in the hash of the block. The blockchain may be used to maintain a ledger of transactions that are requested and performed. Although a blockchain is described, other entities that store data may be appreciated.

A number of transactions may be included in a block. The transactions may be key value pairs that represent data that is accessed in a key value store for the transaction, but other types of transactions may be appreciated. Messaging using BFT protocol 108 is used to agree on a sequence number for a block in blockchain 116. When consensus is reached, the block may be stored in blockchain 116 by replicas 104, and the transactions may be executed. In some embodiments, backup client 114 may not participate in the consensus process to commit blocks to blockchain 116. However, in other embodiments, backup client 114 may also perform the function of a replica and be part of the consensus process. In this case, backup client 114 may communicate with this replica in a similar way as with other replicas 104 in the state machine replication system.

Backup client 114 may generate a backup of blockchain 116 that is referred to as a backup blockchain 124. Although one backup client 114 is shown, there may be a cluster of size K of backup clients. Backup client 114 includes a state transfer service 118 that can communicate with replicas 104 to retrieve data from one or more blockchains 116. The state transfer service will be described in more detail below. Backup client 114 may be trusted in system 100. For example, cryptography may be used to communicate messages between backup client 114 and replicas 104. Different methods may be used to sign messages. For example, backup client 114 may include the public keys for replicas 104-1 to 104-N, which are used to verify the messages from replicas 104-1 to 104-N.

Backup client 114 also includes a backup service 120 that can store blocks for backup blockchain 124 in a storage 122. For example, blocks of backup blockchain 124 may be stored after the blocks are transferred to backup client 114 using state transfer service 118. Storage 122 may be external storage to replicas 104-1 and 104-N. Storage 122 may also be external to backup client 114, or may be stored locally at backup client 114. By using storage that is external to the replicas 104 that participate in the consensus process and having backup client 114 not participate in the consensus process, backup client 114 and storage 122 may be isolated from an attack on replicas 104, and thus may not be subject to data loss when an attack on replicas 104 that participate in the consensus process occurs. Also, storage 122 may be configured with a configuration that allows for a faster transfer of blocks from backup blockchain 124 when blockchain 116 needs to be restored on replicas 104. For example, storage 122 may be configured to transfer data faster than local storage on replicas 104, such as using more processing resources, a faster network, etc.

The following will describe the state transfer service to transfer blocks of blockchain 116 to backup client 114, and then the backup service of storing the blocks in storage 122.

State Transfer Service

Figure 2A:
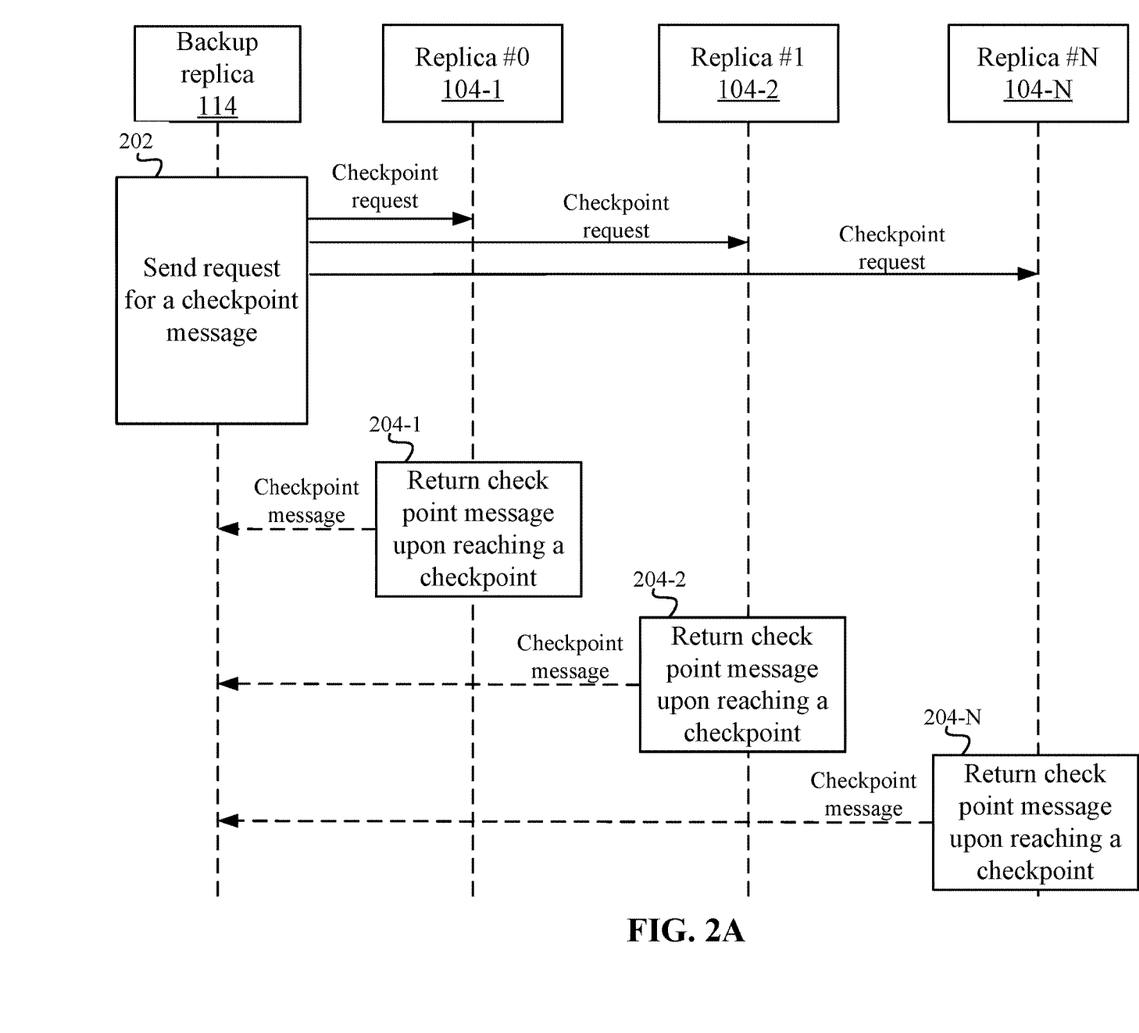
FIG. 2A depicts an example of requesting for checkpoint messages according to some embodiments.
Figure 2B:
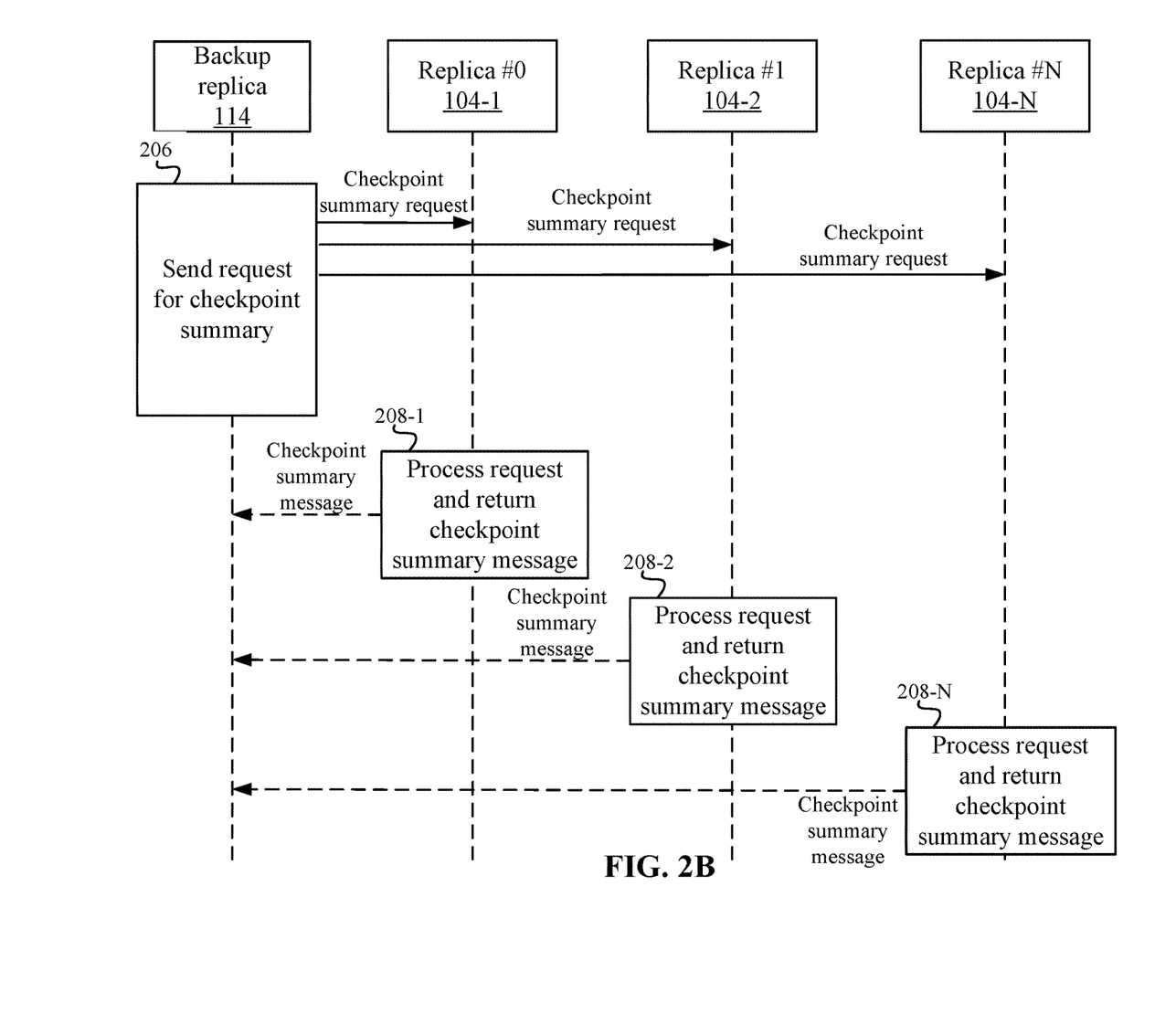
FIG. 2B depicts an example of collecting information for backing up a blockchain according to some embodiments.
Figure 2C:
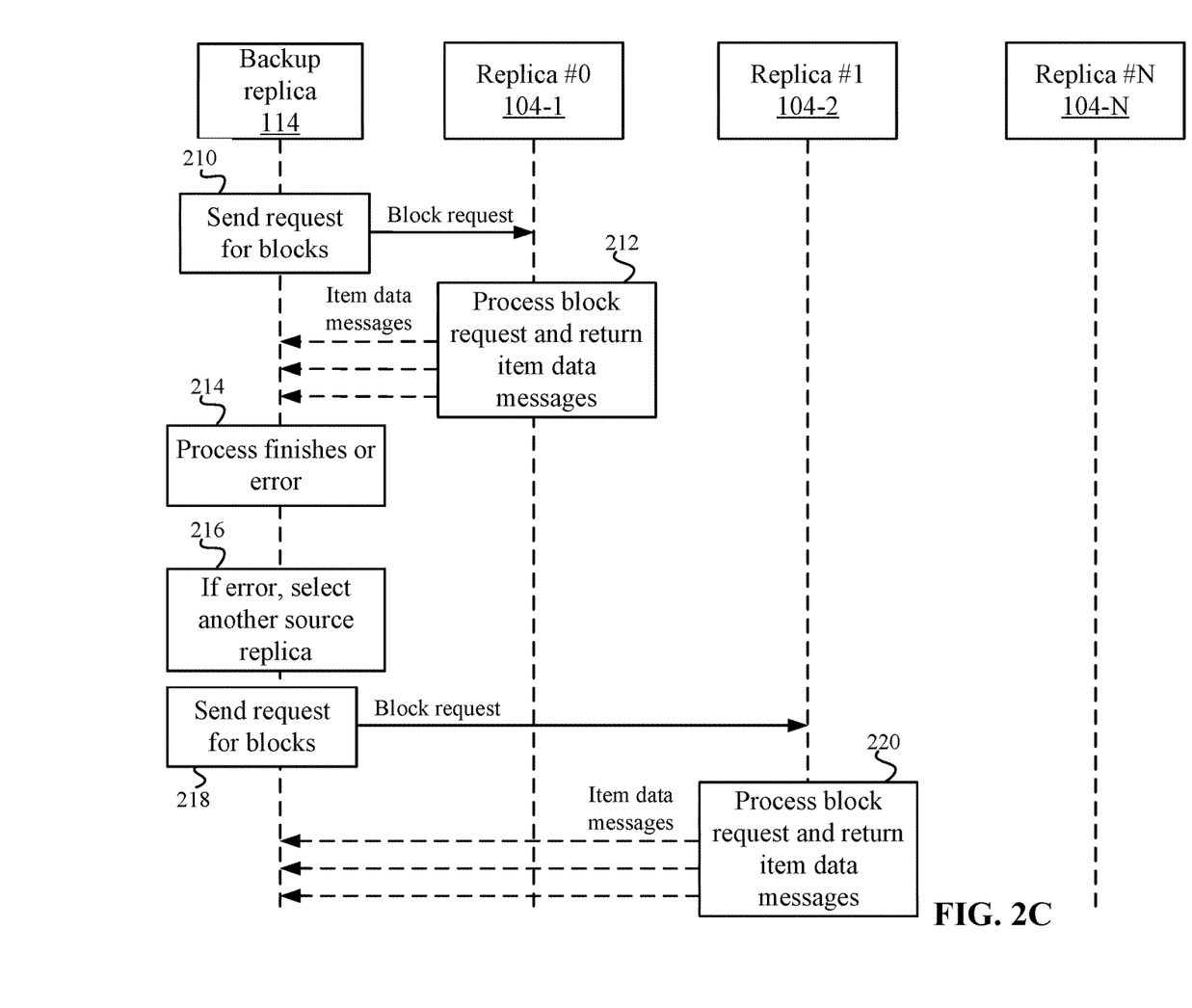
FIG. 2C depicts an example of retrieving blocks from replicas according to some embodiments.

FIGS. 2A to 2C depict a flow for performing the state transfer service 118 according to some embodiments. Backup client 114 communicates with replicas 104-1, 104-2, . . . , 104-N to perform the backup process. A state transfer may be a mechanism that replicas 104 use to sync with other replicas. Communication between replicas 104 may be used to determine when a stable checkpoint is reached. In some embodiments, checkpoints for blockchain 116 may be defined, which may be a number of blocks (e.g., a window) that have been committed to blockchain 116. For example, a checkpoint may be at every 150 blocks being committed to blockchain 116, such as at a block 150, block 300, block 450, etc. A stable checkpoint may be a checkpoint that is reached by at least a number of replicas, such as 2F+1 replicas. In some embodiments, the backup process may be run when stable checkpoints are reached in blockchain 116. However, the backup process may be run at other times, such as every block, every other block, etc., and do not need to be at stable checkpoints. A checkpoint may thus be a time in which a backup of blockchain 116 may be performed.

The following process first determines when a checkpoint is reached in FIG. 2A. Then, the process determines if the backup process should be run and sends requests for metadata for blocks that should be backed up in FIG. 2B. After receiving metadata, the blocks may be requested from one or more source replicas in FIG. 2C.

FIG. 2A depicts an example of requesting for checkpoint messages according to some embodiments. At 202, a request for a checkpoint message is sent by backup client 114. The request for checkpoint message may be sent to all replicas 104 to ask for a checkpoint message. That is, the request for a checkpoint message may request a checkpoint message be sent from replicas 104. The request may be sent on a time interval T, which may be any interval, such as every minute, number of minutes, etc.

Replicas 104 may each receive the request for a checkpoint message. When the request for a checkpoint message is received, the message is processed by replicas 104 to determine whether a checkpoint (e.g., a stable checkpoint) has been reached in blockchain 116. For example, if a block 150 is reached by 2F+1 replicas 104, then it is determined that a stable checkpoint has been reached. If a stable checkpoint is not reached, replica 104 may ignore the request for a checkpoint message and not send a checkpoint message back to backup client 114. Also, in other embodiments, a message indicating a stable checkpoint has not been reached may also be sent.

Upon reaching a stable checkpoint, as shown at 204-1 to 204-N, a checkpoint message may be returned by replicas 104-1 to 104-N. The checkpoint message may include information that describes the state of blockchain 116, such as a sequence number for the block associated with the checkpoint and information for the block associated with the checkpoint, such as a digest (e.g., hash) of a block (e.g., a hash of the last block, another block, and/or set of blocks). Each replica 104 may return the checkpoint message based on the state of its own blockchain 116. Instead of waiting for a checkpoint request, each replica 104 may return a checkpoint message when a checkpoint is reached without receiving a request. However, this mechanism may be part of a larger status function that may include more information than is needed for the backup. The request for a checkpoint message may indicate to replicas 104 that a checkpoint message with only information specified for backing up the blockchain is requested.

Figure 3:
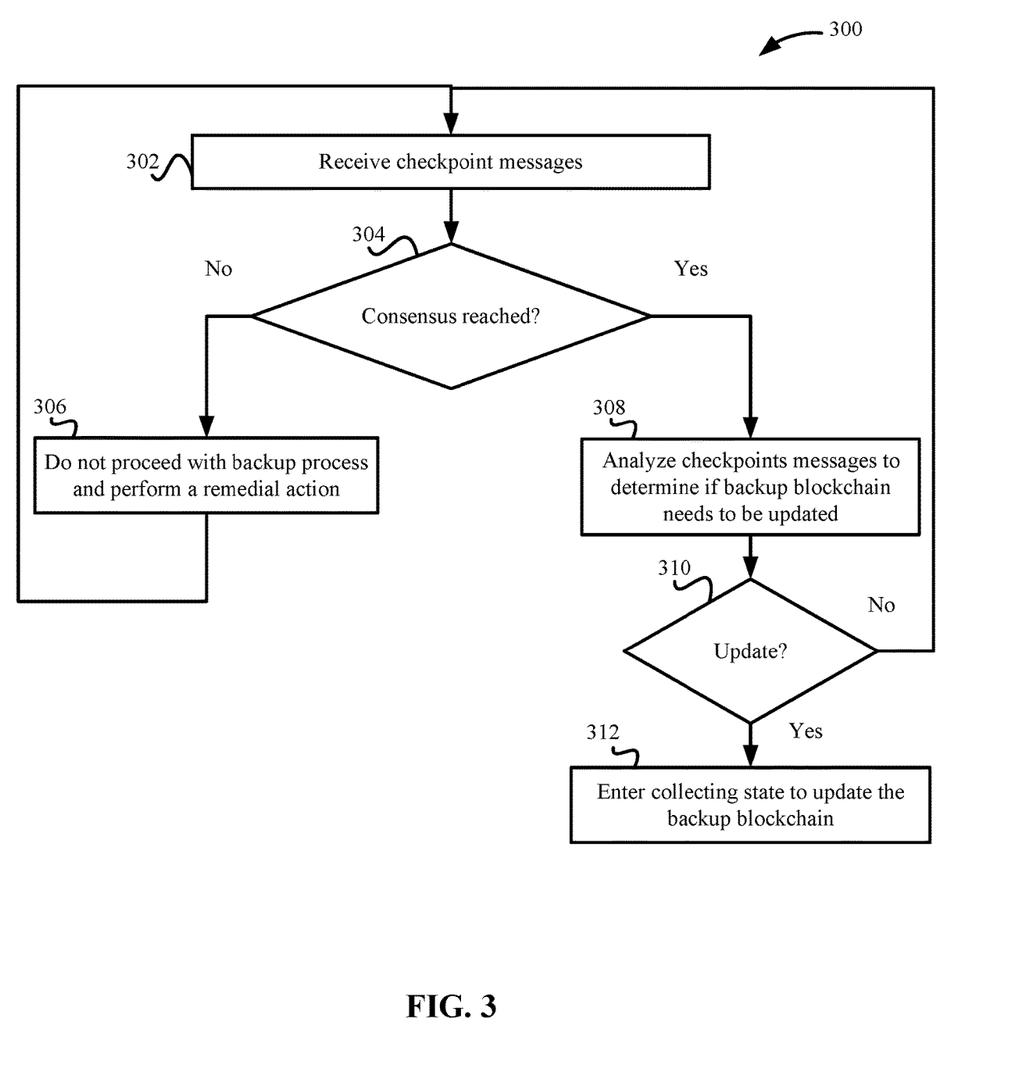
FIG. 3 depicts a simplified flowchart of a method for analyzing checkpoint messages according to some embodiments.

The checkpoint messages may be analyzed by backup client 114 to determine whether a number of replicas, such as F+1 replicas 104, reach consensus on providing the same information in the checkpoint message, such as the same sequence number and information for the block associated with the checkpoint. FIG. 3 depicts a simplified flowchart 300 of a method for analyzing checkpoint messages according to some embodiments. At 302, checkpoint messages from replicas 104 are received by backup client 114. Depending on operating conditions, such as network conditions or if a replica is operating slowly or failed, checkpoint messages may be received by one or more replicas 104 out of the N replicas 104. At 304, it is determined if consensus is reached for the checkpoint messages. For example, state transfer service 118 may require that a number of replicas 104, such as at least F+1 replicas, to reach consensus on returning the same checkpoint message that includes the same sequence number and checkpoint block digest. This ensures that the checkpoint messages that are received can be trusted. For example, if consensus was not reached, a malicious actor may send a checkpoint message with malicious data. At 306, if consensus is not reached, state transfer service 118 may not proceed with the backup process and may perform a remedial action, such as return an error. Other remedial actions may also be determined. The process may also continue to wait until other checkpoint messages are received.

At 308, if consensus is reached, such as F+1 checkpoint messages are received that are the same, the checkpoint messages are analyzed by state transfer service 118 to determine if backup blockchain 124 needs to be updated. At 310, it is determined whether an update is needed. In some embodiments, backup blockchain 124 may be updated at stable checkpoints. For example, the last reachable block in backup blockchain 124 may be at block 150, and if a checkpoint message that is sent is at block 300, then backup blockchain 124 may need to be updated. A reachable block may be a block that is chained to the genesis block via consecutive blocks. However, if the checkpoint messages indicate that block 150 is the current block being stored at blockchain 116, then backup blockchain 124 may not need to be updated.

If an update is not needed, then the process waits until another interval occurs where requests for checkpoint messages are sent and received. If an update does need to be performed, at 312, a collecting state is entered at state transfer service 118 to update backup blockchain 124.

FIG. 2B depicts an example of collecting information for backing up blockchain 116 according to some embodiments. At 206, requests for a checkpoint summary are sent by backup client 114. The request for a checkpoint summary may ask for a checkpoint summary message for identified blocks in blockchain 116, which may be the blocks that need to be backed up in backup blockchain 124. For example, state transfer service 118 may ask for checkpoint summaries from the block after the last stored checkpoint in backup blockchain 124. Also, a range of values may be requested, specific blocks may be requested, etc.

At 208-1 to 208-N, the request for the checkpoint summary is processed by replicas 104-1 to 104-N, which then return a checkpoint summary message. The checkpoint summary message may include information (e.g., metadata) for each block that has been requested. For example, if blocks 151-300 need to be backed up in backup blockchain 124, metadata for each of blocks 151-300 is sent in the checkpoint summary message. The information may allow each block to be identified and requested for transfer to backup client 114. For example, the information may include an identifier for each block, such as the sequence number of each block and other information, such as a hash of each block. The checkpoint messages are then processed.

Figure 4:
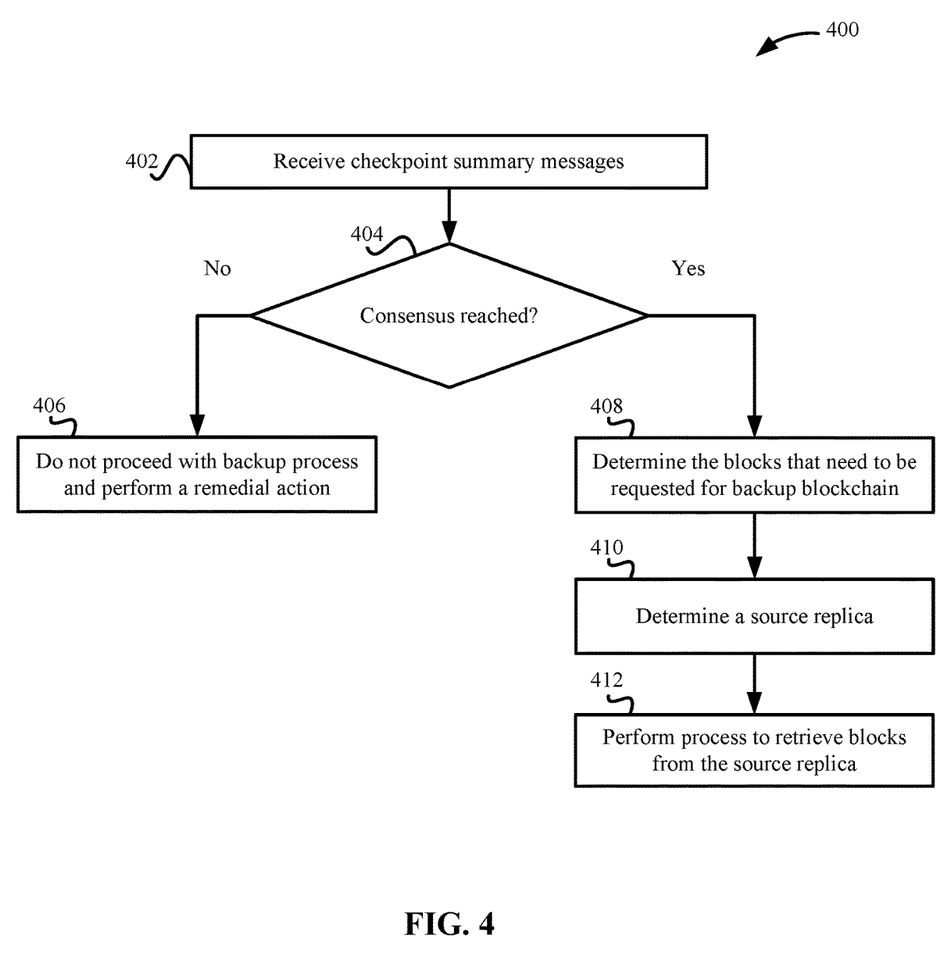
FIG. 4 depicts an example of processing checkpoint summary messages according to some embodiments.

FIG. 4 depicts an example of processing checkpoint summary messages according to some embodiments. At 402, checkpoint summary messages from replicas 104 are received by state transfer service 118. In some embodiments, it may be determined if consensus is reached by receiving the same checkpoint summary messages from a number of replicas 104, such as F+1 replicas 104. At 404, state transfer service 118 determines if consensus is reached. For example, the information for the blocks is validated with a signature from each respective replica 104 and it is determined if the same information is included for the blocks. If consensus is not reached, at 406, state transfer service 118 may not proceed with the backup process and perform a remedial action, such as return an error. The process may then wait for another interval in which requests for checkpoint messages are sent again as shown in FIG. 2A.

If consensus is reached, at 408, blocks that need to be requested for backup are determined by state transfer service 118, such as a first block and a last block that need to be requested for the backup blockchain 124. For example, if blocks 151-300 need to be backed up, the first block may be 151 and the last block may be 300. Also, the blocks to request do not need to be contiguous.

At 410, state transfer service 118 determines a source replica 104 in which to request the blocks. The source replica 104 may be determined in different ways. For example, source replicas 104 may be selected arbitrarily, based on current load, etc. In some embodiments, multiple source replicas 104 may be selected to send requests for blocks to reduce the load on one source replica 104. In some embodiments, 50 blocks may be retrieved from multiple source replicas 104.

At 412, state transfer service 118 performs the process to retrieve blocks from the source replica or replicas. Different processes for retrieving blocks may be used. FIG. 2C depicts an example of retrieving blocks from replicas 104 according to some embodiments. The process starts with one replica. At 210, backup client 114 sends a request for blocks to source replica 104-1. The block request message may indicate the first and last required blocks, or other methods may be used, such as requesting any blocks after a block number.

At 212, source replica 104-1 processes the block request and returns item data messages to backup client 114. The item data messages may include information that is stored for the blocks of a respective blockchain 116 that is associated with source replica 104-1. In some examples, the item data messages may start from the last block that is referenced in the block request message and continue backwards until the first block is reached. This order may be used because blocks of blockchain 116 may be chained in the reverse order. For example, a block #300 may include a signed hash of block #249, block #249 may include a signed hash of block #248, and so on. A block that is received can thus be verified using the signed hash from the previous block that has been received by comparing the hash of the block that is received to the hash included in the next block in the sequence of the blockchain.

At 214, the process finishes or there is an error. In some embodiments, the process may finish when the last block that is requested in the block request message is received. Different methods may be used to determine that the last block message is received. For example, the sequence number of the last block may be compared to the first block that was requested to determine that the last block has been received. Also, a virtual block (VBLOCK) may be the last block that is sent. The virtual block may contain the reserved pages that are used for storing the internal data for replicas. For example, the reserved pages may represent system data that may be stored on the blockchain. The reserved pages may be used by replicas to agree (or inform each other) about various parameters/data. A virtual block is a way to transfer the reserved pages during a state transfer. The reserved pages may not be an actual block on the blockchain. However, the virtual block may be used to transfer the reserved pages in the same method as blocks of the blockchain were transferred. Other than a reserved pages, other information that is needed to perform operations with the blockchain may also be transferred during the backup process, and may not have to use the virtual block.

At 216, if an error results, backup client 114 may select another source replica 104. An error may occur for different reasons, such as when there are timeouts where an item data message is not received within a time period, or a network outage occurs that affects delivery of the item data messages, etc. The process may end if an error does not occur.

When the new source replica 104 is selected, at 218, a request for blocks that are needed is sent by backup client 114 to the new source replica. The request may indicate a new first and last block based on the blocks that had already been received in the item data messages. For example, if blocks 175-300 have already been received, then the request for blocks 151-174 may be sent to source replica 104-2. At 220, the block request is processed by source replica 104-2 and item data messages are returned to backup client 114 as described above. The above process continues until the information for the blocks that have been requested has been received. For example, if multiple source replicas 104 are being used, another source replica 104 may be selected, such as to download blocks 251 to 300 if blocks 301 to 350 have been downloaded.

Backup Blockchain States

Figure 5:
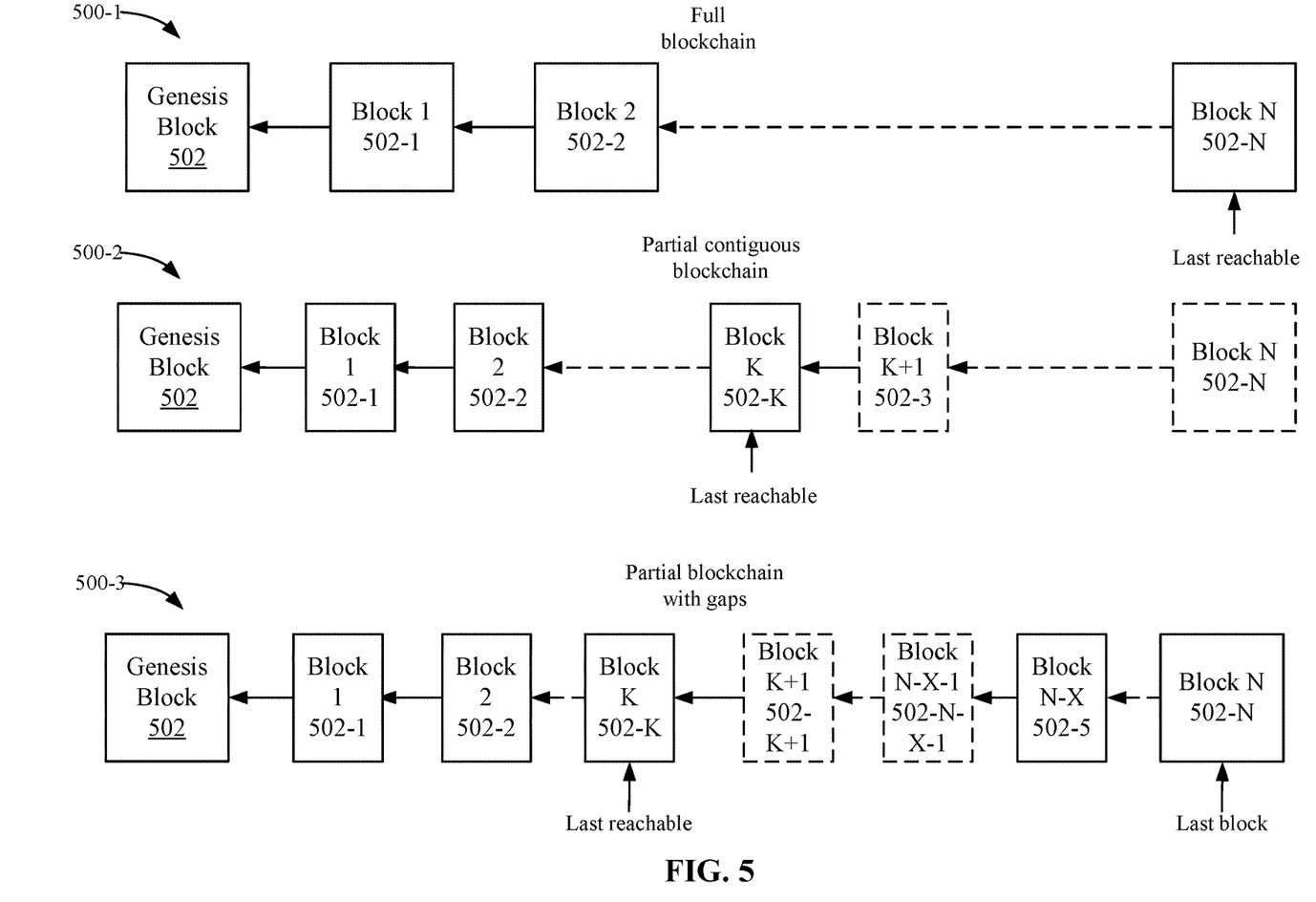
FIG. 5 depicts an example of backup blockchains to determine which blocks to request according to some embodiments.

The state of backup blockchain 124 may be different at different times. FIG. 5 depicts an example of backup blockchains 124 in different states according to some embodiments. At 500-1, a full backup blockchain is shown. Backup blockchain 124 may include a genesis block 502, which may be the first block of a blockchain. Then, each successive block may refer back to the prior block. For example, block #1 502-1 includes a signed hash of genesis block 502; block #2 502-2 includes a signed hash of block #1 502-1. This process continues until the last reachable block of block #N 502-N, which is the last block that is chained to the genesis block. The dotted arrow between block #2 and block #N indicates that any number of blocks may be included between these blocks. A solid arrow may indicate consecutive blocks.

The backup blockchains 124 at 500-2 and 500-3 show different states of backup blockchains that may include missing blocks from the full blockchain 116. At 500-2, backup blockchain 124 may be a partial contiguous backup blockchain of blockchain 116. In this case, there may be blocks missing after the last reachable block of backup blockchain 124. For example, backup blockchain 124 may include blocks between genesis block 502 and block K 502-K, which is the last reachable block. However, blockchain 116 may include blocks K+1 502-3 to block N 502-N. The dashed lines on the outline of blocks K+1 to block N indicate these blocks are not found in backup blockchain 124. In this case, state transfer service 118 sends a request for block K+1 to block N.

A partial blockchain with gaps may also be found. At 500-3, backup blockchain 124 includes genesis block 502 to block K 502-K, which is the last reachable block. Also, after a gap in backup blockchain 124, backup blockchain 124 includes block N-X 502-5 to block N 502-N. Backup blockchain 124 is missing block K+1 502-K+1 to block N-X-1 502-N-X-1. In this case, the range of blocks starting after block K 502-K and before block N-X are missing from backup block chain 124. The partial blockchain with gaps may occur when state transfer service 118 has not finished receiving blocks for a backup. This is because the latest block from a checkpoint message is downloaded first, and then other blocks are downloaded in reverse order.

Block Storage

Backup service 120 may store blocks in backup blockchain 124 using different methods. For example, a whole block may be transferred by backup service 120 as a file that is stored in storage 122. In some embodiments, a binary of the block is stored. The block may include the header, transactions, and the previous block hash. A binary of this information may be taken and stored. In other embodiments, the transactions, which may be key value pairs, of each block may be written to storage 122 for a block. Each key value pair may be written, and when all key value pairs are written, the block may be replicated. The key value pair may a key that is used in the transaction, and the value is a value that is read or written in the transaction. For example, the key value pair may be <key #1, value #1>. The listing of the key value pair is different from accessing the key and reading or writing the value to the key in a key value store. In some embodiments, the storage of blocks may be performed in parallel, and when all of the information for the blocks is written (e.g., the block header, transactions, and hash for the previous block), the block may be considered replicated.

Figure 6:
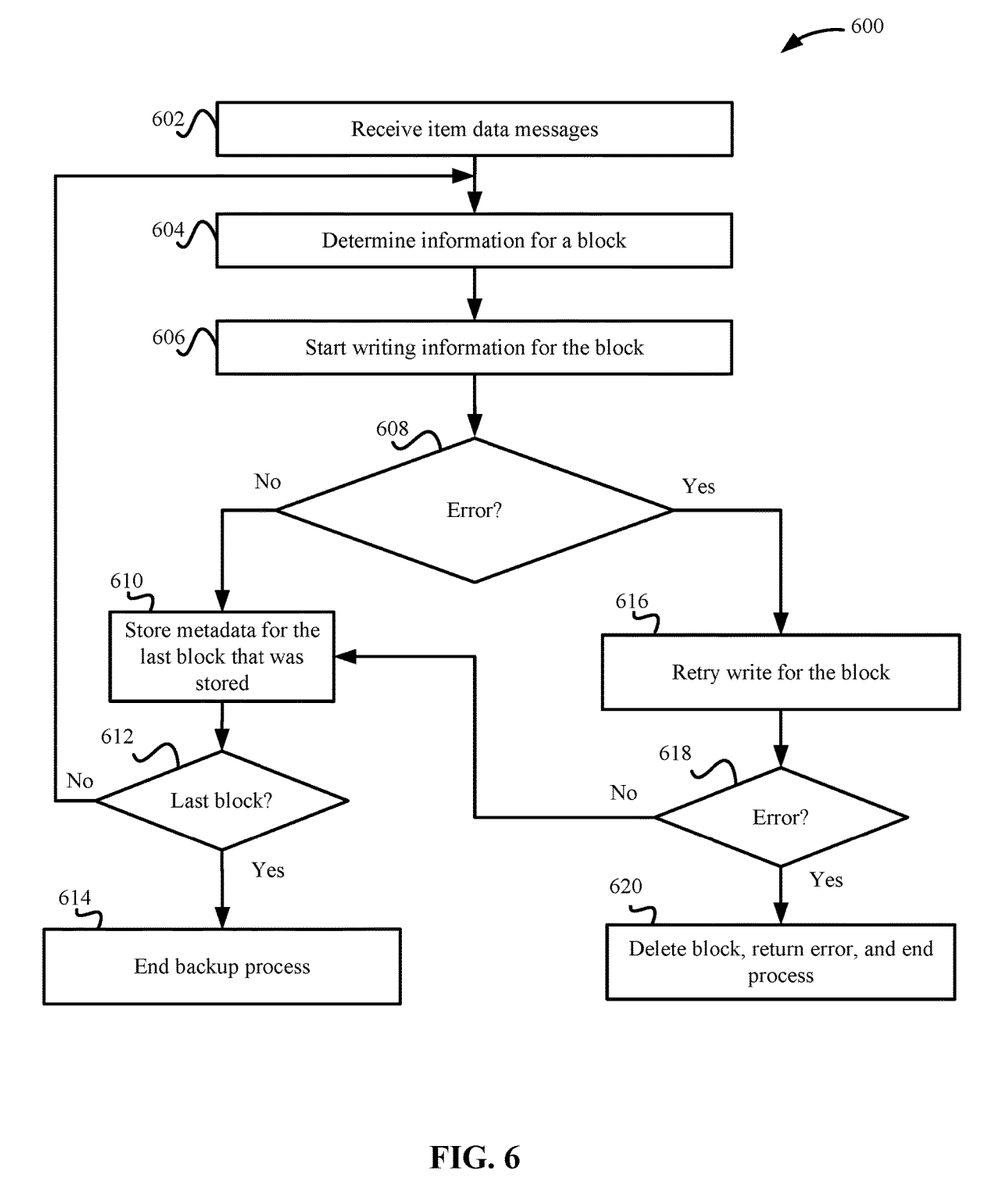
FIG. 6 depicts a simplified flowchart of a method for storing blocks in backup blockchain according to some embodiments.

FIG. 6 depicts a simplified flowchart of a method for storing blocks in backup blockchain 124 according to some embodiments. At 602, the item data messages are received by backup client 114. At 604, information for a block is determined. Then, at 606, the information for the block may be written to backup blockchain 124 by backup service 120. As discussed above, the whole block may be transferred as a file, or key value pairs for the transactions may be written to storage 122. At 608, it is determined if an error occurs. The error may occur such as when network connectivity is lost before the entire block is written to backup blockchain 124. If there is no error, at 610, backup service 120 stores metadata from the last block. The metadata may indicate the last block that is written to backup blockchain 124. For example, the metadata indicates the block identifier or the hash of the last block that is written to backup blockchain 124.

At 612, it is determined if this is the last block to write to backup blockchain 124. If not, the process continues at 604 to determine information for another block. If it is the last block, at 614, the backup process ends.

If an error does occur in the process, at 616, the write for the block may be retried by backup service 120. This may include trying to store the whole block again as a file. Or, if key value pairs were being written, the already-written key value pairs to storage 122 may be removed, and the entire set of key value pairs for the block may be written again. At 618, it is determined if an error occurs. If an error does occur again, it is possible that the backup process may end or a write for the block may be re-tried again. In the case where the backup process ends, at 620, whatever was written from the block may be deleted, an error may be returned, and the backup process may be ended. Other remedial actions may also be appreciated. If an error does not occur from the re-try of the write of the block, the process proceeds to 610 to store metadata from the last block that was written as was described above.

Restoration Process

Backup blockchain 124 may be used to restore blocked chains 116 to replicas 104. Different methods may be appreciated. For example, the complete blockchain 116 may be restored to replica 104 from backup blockchain 124. Also, a portion of backup blockchain 124 may be restored, which may allow replica 104 to restart faster instead of waiting for the entire blockchain 116 to restore. Also, a hybrid approach would be to retrieve a portion of the blockchain 116, such as the latest blocks are restored, and then the blocks before are restored that while replica 104 is restarted. The blocks may be restored in the same process as syncing a state of a blockchain 116 from another replica except that backup blockchain 124 is used.

Pruning of Blockchain 116

Backup client 114 may communicate the last block that is stored in backup blockchain 124 to replicas 104. Replicas 104 may delete (e.g., prune) blocks from blockchain 116 that are backed up in backup blockchain 124. The blocks that are deleted may be selected differently. For example, the oldest blocks in blockchain 116 may be deleted to maintain the size of blockchain 116 at a desired size. Sections of the blockchain that have not been recently used may be deleted also. Different methods of deleting blocks from blockchain 116 may be appreciated.

Conclusion

Accordingly, backup blockchain 124 may be used to restore blockchains 116 in replicas 104 when needed. The process of generating backup blockchain 124 may be trusted because a consensus of checkpoint messages and checkpoint summary messages is reached before proceeding with the transfer of blocks in blockchain 116 to backup client 114. Also, the restoration process can be improved by not having to take a replica 104 offline to restore a blockchain. Further, the pruning of blockchains 116 may be enabled because of the existence of backup blockchain 124.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. Various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents may be employed without departing from the scope of the disclosure as defined by the claims.

What is claimed is:

1. A method for using a backup client to back up a blockchain in a state machine replication system comprising N replicas, the method comprising:
    sending a plurality of first messages that request first information, the first information including identification information for a set of blocks of the blockchain to the N replicas, wherein each replica in the N replicas maintains a respective instance of the blockchain;
    receiving a plurality of second messages from at least a portion of the N replicas, the plurality of second messages including the first information for the set of blocks from each respective instance of the blockchain that is maintained by the at least the portion of the N replicas;
    analyzing the first information from the plurality of second messages to determine whether a consensus on the first information included in the plurality of second messages is reached by a number of replicas;
    when consensus is reached, sending to a replica a request that identifies, using the identification information, one or more blocks to back up to a backup blockchain;
    receiving second information, that is stored, for the one or more blocks in the respective instance of the blockchain from the replica; and
    using the second information to back up the one or more blocks in the backup blockchain.

2. The method of claim 1, further comprising:
    before sending the plurality of first messages, receiving a plurality of third messages from the at least the portion of the N replicas, wherein the plurality of third messages indicate a state of each respective instance of the blockchain that is stored by the N replicas; and
    analyzing the plurality of third messages to determine whether a consensus on the state is reached by the number of replicas.

3. The method of claim 2, wherein the plurality of third messages are received based on sending of a plurality of fourth messages, wherein the plurality of fourth messages request the state of each respective instance of the blockchain from the N replicas.

4. The method of claim 2, further comprising:
    when the consensus on the state is reached, determining whether the backup blockchain needs to be updated based on the state of each respective instance of the blockchain that is received in the plurality of third messages.

5. The method of claim 4, wherein the backup blockchain needs to be updated when the backup blockchain is missing a block from respective instances of the blockchain that are stored on the number of replicas.

6. The method of claim 1, wherein the backup blockchain is stored in storage external to the N replicas, the method comprising:
    restoring a block from the backup blockchain to a respective instance of the blockchain that is maintained by a replica.

7. The method of claim 1, further comprising:
    when the block is stored in the backup blockchain, communicating a status of the backup blockchain to the replica to allow the replica to delete a block in the blockchain, wherein the blockchain is stored by the replica.

8. A non-transitory computer-readable storage medium containing instructions for using a backup client to back up a blockchain in a state machine replication system comprising N replicas, wherein the instructions, when executed, control a computer system to be operable for:
    sending a plurality of first messages that request first information, the first information including identification information for a set of blocks of the blockchain to the N replicas, wherein each replica in the N replicas maintains a respective instance of the blockchain;
    receiving a plurality of second messages from at least a portion of the N replicas, the plurality of second messages including the first information for the set of blocks from each respective instance of the blockchain that is maintained by the at least the portion of the N replicas;

analyzing the first information from the plurality of second messages to determine whether a consensus on the first information included in the plurality of second messages is reached by a number of replicas;

when consensus is reached, sending to a replica a request that identifies, using the identification information, one or more blocks to back up to a backup blockchain;

receiving second information, that is stored, for the one or more blocks in the respective instance of the blockchain from the replica; and using the second information to back up the one or more blocks in the backup blockchain.

9. The non-transitory computer-readable storage medium of claim 8, further operable for:

before sending the plurality of first messages, receiving a plurality of third messages from the at least the portion of the N replicas, wherein the plurality of third messages indicate a state of each respective instance of the blockchain that is stored by the N replicas; and analyzing the plurality of third messages to determine whether a consensus on the state is reached by the number of replicas.

10. The non-transitory computer-readable storage medium of claim 9, wherein the plurality of third messages are received based on sending of a plurality of fourth messages, wherein the plurality of fourth messages request the state of each respective instance of the blockchain from the N replicas.

11. The non-transitory computer-readable storage medium of claim 9, further operable for:

when the consensus on the state is reached, determining whether the backup blockchain needs to be updated based on the state of each respective instance of the blockchain that is received in the plurality of third messages.

12. The non-transitory computer-readable storage medium of claim 11, wherein the backup blockchain needs to be updated when the backup blockchain is missing a block from respective instances of the blockchain that are stored on the number of replicas.

13. The non-transitory computer-readable storage medium of claim 9, wherein the backup blockchain is stored in storage external to the N replicas, and the instructions are further operable for:

restoring a block from the backup blockchain to a respective instance of the blockchain that is maintained by a replica.

14. The non-transitory computer-readable storage medium of claim 9, further operable for:

when the block is stored in the backup blockchain, communicating a status of the backup blockchain to the replica to allow the replica to delete a block in the blockchain, wherein the blockchain is stored by the replica.

15. An apparatus for using a backup client to back up a blockchain in a state machine replication system comprising N replicas, the apparatus comprising:

one or more computer processors; and a non-transitory computer-readable storage medium comprising instructions, that when executed, control the one or more computer processors to be operable for:

sending a plurality of first messages that request first information that includes identification information for a set of blocks of the blockchain to the N replicas, wherein each replica in the N replicas maintains a respective instance of the blockchain;

receiving a plurality of second messages from at least a portion of the N replicas including the first information for the set of blocks from each respective instance of the blockchain that is maintained by the at least the portion of the N replicas;

analyzing the first information from the plurality of second messages to determine whether a consensus on the first information included in the plurality of second messages is reached by a number of replicas;

when consensus is reached, sending a request to a replica that identifies one or more blocks using the identification information to back up to a backup blockchain;

receiving second information that is stored for the one or more blocks in the respective instance of the blockchain from the replica; and using the second information to back up the one or more blocks in the backup blockchain.

16. The apparatus of claim 15, further operable for:

before sending the plurality of first messages, receiving a plurality of third messages from the at least the portion of the N replicas, wherein the plurality of third messages indicate a state of each respective instance of the blockchain that is stored by the N replicas; and analyzing the plurality of third messages to determine whether a consensus on the state is reached by the number of replicas.

17. The apparatus of claim 16, wherein the plurality of third messages are received based on sending of a plurality of fourth messages, wherein the plurality of fourth messages request the state of each respective instance of the blockchain from the N replicas.

18. The apparatus of claim 16, further operable for:

when the consensus on the state is reached, determining whether the backup blockchain needs to be updated based on the state of each respective instance of the blockchain that is received in the plurality of third messages.

19. The apparatus of claim 18, wherein the backup blockchain needs to be updated when the backup blockchain is missing a block from respective instances of the blockchain that are stored on the number of replicas.

20. The apparatus of claim 15, wherein the backup blockchain is stored in storage external to the N replicas, and the instructions are further operable for:

restoring a block from the backup blockchain to a respective instance of the blockchain that is maintained by a replica.

21. The apparatus of claim 15, further operable for:

when the block is stored in the backup blockchain, communicating a status of the backup blockchain to the replica to allow the replica to delete a block in the blockchain, wherein the blockchain is stored by the replica.

* * * * *